(12) United States Patent
Majumdar et al.

(10) Patent No.: US 8,717,925 B2
(45) Date of Patent: May 6, 2014

(54) TESTING TCP CONNECTION RATE

(75) Inventors: Partha Majumdar, Woodland Hills, CA (US); Rohan Chitradurga, Simi Valley, CA (US)

(73) Assignee: Ixia, Calabasas, CA (US)

(*) Notice: Subject to any disclaimer, the term of this patent is extended or adjusted under 35 U.S.C. 154(b) by 383 days.

(21) Appl. No.: 13/334,496

(22) Filed: Dec. 22, 2011

(65) Prior Publication Data

US 2013/0163445 A1 Jun. 27, 2013

(51) Int. Cl.
*H04L 12/26* (2006.01)
*H04L 12/24* (2006.01)
*H04W 24/06* (2009.01)

(52) U.S. Cl.
CPC ............ *H04L 43/50* (2013.01); *H04L 43/08* (2013.01); *H04L 43/0852* (2013.01); *H04L 41/5038* (2013.01); *H04W 24/06* (2013.01)
USPC .......................................... 370/252; 709/224

(58) Field of Classification Search
None
See application file for complete search history.

(56) References Cited

U.S. PATENT DOCUMENTS

| | | | | |
|---|---|---|---|---|
| 4,910,731 A * | 3/1990 | Sakurai et al. | ............... | 370/413 |
| 6,069,872 A * | 5/2000 | Bonomi et al. | ............... | 370/236 |
| 6,151,321 A * | 11/2000 | Benson et al. | ............ | 370/395.42 |
| 6,363,464 B1 * | 3/2002 | Mangione | ..................... | 711/167 |
| 6,483,839 B1 * | 11/2002 | Gemar et al. | ............ | 370/395.42 |
| 6,504,824 B1 * | 1/2003 | Tanaka et al. | ................ | 370/252 |
| 6,560,198 B1 * | 5/2003 | Ott et al. | ........................ | 370/235 |
| 6,618,360 B1 * | 9/2003 | Scoville et al. | ............... | 370/248 |
| 6,832,255 B1 * | 12/2004 | Rumsewicz et al. | ......... | 709/227 |
| 6,973,043 B1 * | 12/2005 | Farooq | .......................... | 370/250 |
| 6,980,513 B2 * | 12/2005 | Novick | .......................... | 370/230 |
| 7,194,535 B2 * | 3/2007 | Hannel et al. | ................ | 709/224 |
| 7,539,489 B1 * | 5/2009 | Alexander | .................... | 455/423 |
| 7,639,651 B2 * | 12/2009 | Di Lodovico et al. | ........ | 370/337 |
| 7,904,542 B1 * | 3/2011 | Dispensa et al. | ............. | 709/224 |
| 8,125,902 B2 * | 2/2012 | Rochon et al. | ............. | 370/230.1 |
| 8,174,991 B1 * | 5/2012 | Trivedi | .......................... | 370/241 |
| 8,607,145 B2 * | 12/2013 | Kotturu et al. | ................ | 715/733 |
| 2001/0028256 A1 * | 10/2001 | Hayashi | ........................ | 324/765 |
| 2004/0100994 A1 * | 5/2004 | Miller | ............................ | 370/503 |
| 2004/0151167 A1 * | 8/2004 | Chiussi et al. | ................ | 370/353 |

(Continued)

OTHER PUBLICATIONS

Information Sciences Institute University of Southern California, Transmission Control Protocol Darpa Internet Program Protocol Specification, http://tools.ietf.org/html/rfc793; accessed Jan. 19, 2012, pp. 1-90.

*Primary Examiner* — Bunjob Jaroenchonwanit
(74) *Attorney, Agent, or Firm* — SoCal IP Law Group LLP; John E. Gunther; Steven C. Sereboff

(57) ABSTRACT

Methods and apparatus to test connection rate of a network device. T connections between a test system and the network device may be defined and C connections of the T connections may be initiated in each of a plurality of sequential time intervals, where T and C are positive integers and T>C. Connection identifiers associated with active connections and inactive connections may be stored in first-in first-out active and idle queues, respectively. Connection identifiers associated with the initiated connections may be moved from the head of the idle queue to the tail of the active queue. When a number NI of connection identifiers in the idle queue at the start of a time interval is less than C, C−NI connections associated with connection identifiers at the head of the active queue may be aborted and re-initiated.

8 Claims, 6 Drawing Sheets

NI = number of connections in idle queue
C = number of connections to open in each time slot

(56) References Cited

U.S. PATENT DOCUMENTS

| | | |
|---|---|---|
| 2005/0060574 A1* | 3/2005 | Klotz et al. ............... 713/201 |
| 2008/0062899 A1* | 3/2008 | Huang et al. ............... 370/310 |
| 2008/0117907 A1 | 5/2008 | Hein |
| 2008/0144656 A1* | 6/2008 | Frishberg et al. ............ 370/466 |
| 2009/0089004 A1* | 4/2009 | Vook et al. ............... 702/123 |
| 2010/0008248 A1 | 1/2010 | Constantine et al. |
| 2010/0050028 A1* | 2/2010 | Kuo ............... 714/704 |
| 2010/0268524 A1* | 10/2010 | Nath et al. ............... 703/23 |
| 2011/0103235 A1* | 5/2011 | Luong et al. ............... 370/245 |
| 2011/0249808 A1* | 10/2011 | Pavel et al. ............... 379/26.01 |
| 2011/0296015 A1* | 12/2011 | Chakravarty et al. ......... 709/224 |
| 2012/0236728 A1* | 9/2012 | Dalmau et al. ............... 370/241 |
| 2013/0148508 A1* | 6/2013 | Sun et al. ............... 370/241 |

* cited by examiner

TESTING TCP CONNECTION RATE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged. The User Datagram Protocol (UDP) is an alternative layer 4 protocol that provides for delivery of packet streams. UDP connections are stateless and do not provide for reliable delivery.

Layer 7 protocols include the Hyper-Text Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In this patent, the term "network under test" (NUT) encompasses all or a portion of a packet switched communications network or one or more network devices within, or for use in, a packet switched communications network. In order to test a NUT, test traffic comprising a large number of packets may be generated and transmitted to and/or through the NUT at one or more ports. Return test traffic transmitted through and/or from the NUT may be received at different ports. The received test traffic may be analyzed to measure the performance of the NUT. In this context, the term "port" refers to a communications connection between the NUT and the equipment used to test the network. The term "port unit" refers to a module within the network test equipment that connects to the NUT at a port. Each port unit connected to the NUT may be both a source of test traffic and a destination for test traffic. Each port unit may emulate a plurality of logical source or destination addresses. Each port unit may emulate a plurality of network users, clients, peers, servers, or other network devices.

The test traffic may depend on the type of network or device to be tested and the type of test to be performed. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant.

When the NUT operates at a higher layer of the network structure (for example, when the NUT is or includes a server, a server load balancer, a firewall, a network security device that performs packet inspection, or similar network devices), the test traffic may include or be a large plurality of TCP connections. One test that may be performed is to determine if the NUT can accept and/or forward TCP connections initiated at a predefined rate (i.e. a specified number of connections per second) without error. A predictable way to measure TCP connection rate is to have test equipment connected to the NUT initiate TCP connections at the predetermined rate and then check if any errors are committed by the NUT. Optionally, to measure a maximum TCP connection rate of the NUT, the connection initiation rate may be progressively increased until errors occur.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
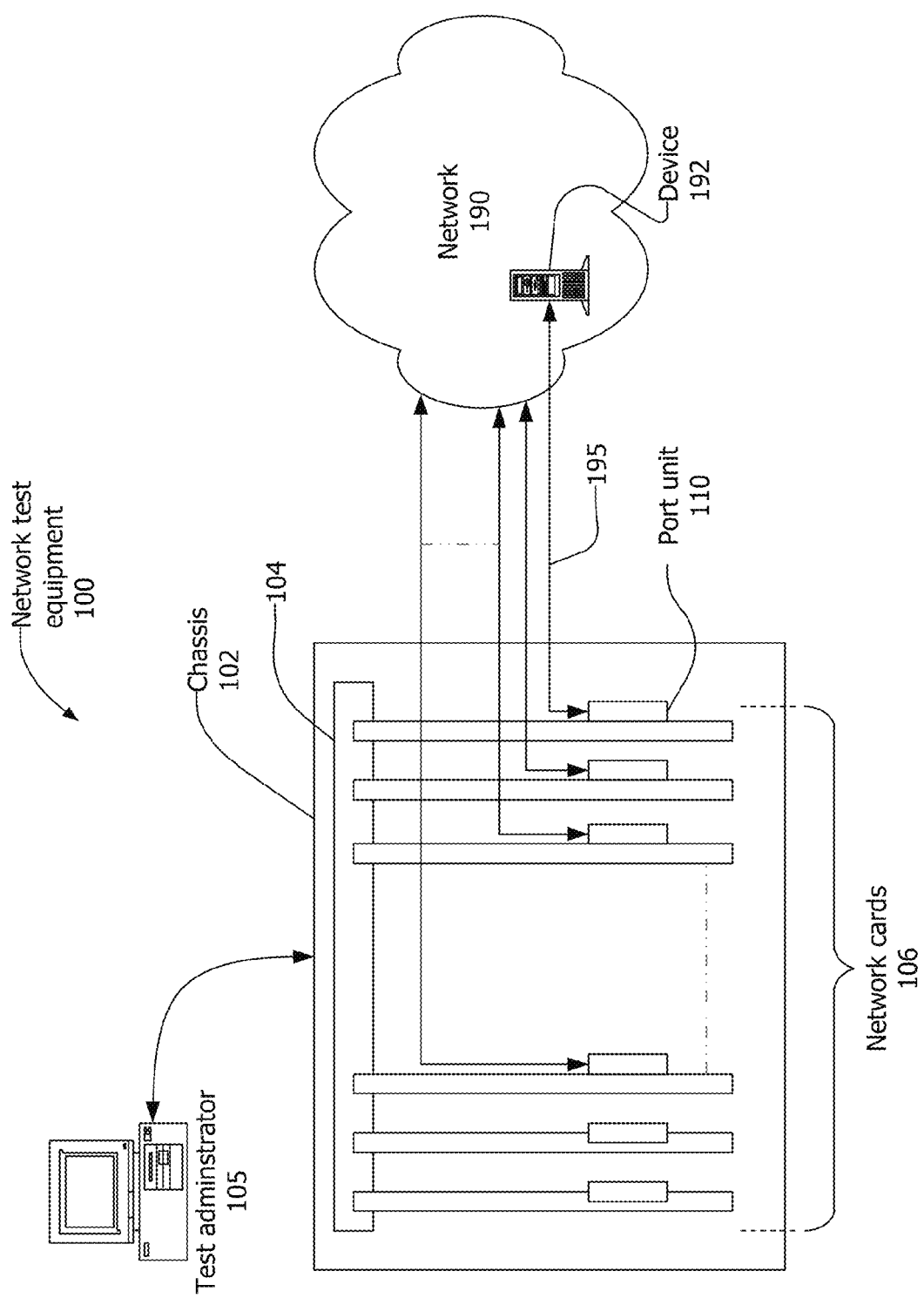
FIG. 1 is a block diagram of a network environment.

FIG. 1 shows a block diagram of a network environment. The environment may include a test administrator 105, network test equipment 100, and a network 190 which includes one or more network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may support a single communications protocol, may support a number of related protocols, or may support a number of unrelated protocols. One or more network cards 106 or their equivalent may be permanently installed in a self-contained test unit or tests appliance.

Each network card 106 may contain one or more port unit 110. Each port unit may include circuits and software to generate test traffic and/or to receive and analyze test traffic. Each port unit may be coupled to the test administrator 105. Each port unit 110 may connect to the network 190 through one or more ports. Each port unit 110 may be connected to the network 190 through a communication medium 195, which may be a wire, an optical fiber, a wireless link, or other communication medium.

The backplane 104 may serve as a bus or communications medium for the network cards 106. The backplane 104 may also provide power to the network cards 106.

The test administrator 105 may be a computing device included within or coupled to the network test equipment 100. The test administrator 105 may include an operator interface (not shown) that may be used to plan a test session, to control the test session, and/or to view test results during and after the test session. The operator interface may include, for example, a display and a keyboard, mouse, and/or other input devices (not shown). The test administrator 105 may include or be coupled to a printer or other data output device (not shown) for output of test results. The test administrator 105 may include or be coupled to a storage device (not shown) for storing test data and results for future review and/or analysis.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel.

The one or more network devices 192 may be any devices capable of communicating over the network 190. The one or more network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the one or more network devices 192 may include appliances, alarm systems, and any other device or system capable of communicating over a network. The network 190 may consist of a single network device 192 or a plurality of network devices interconnected by a plurality of communications paths, all of which will be referred to herein as the network under test (NUT).

Figure 2:
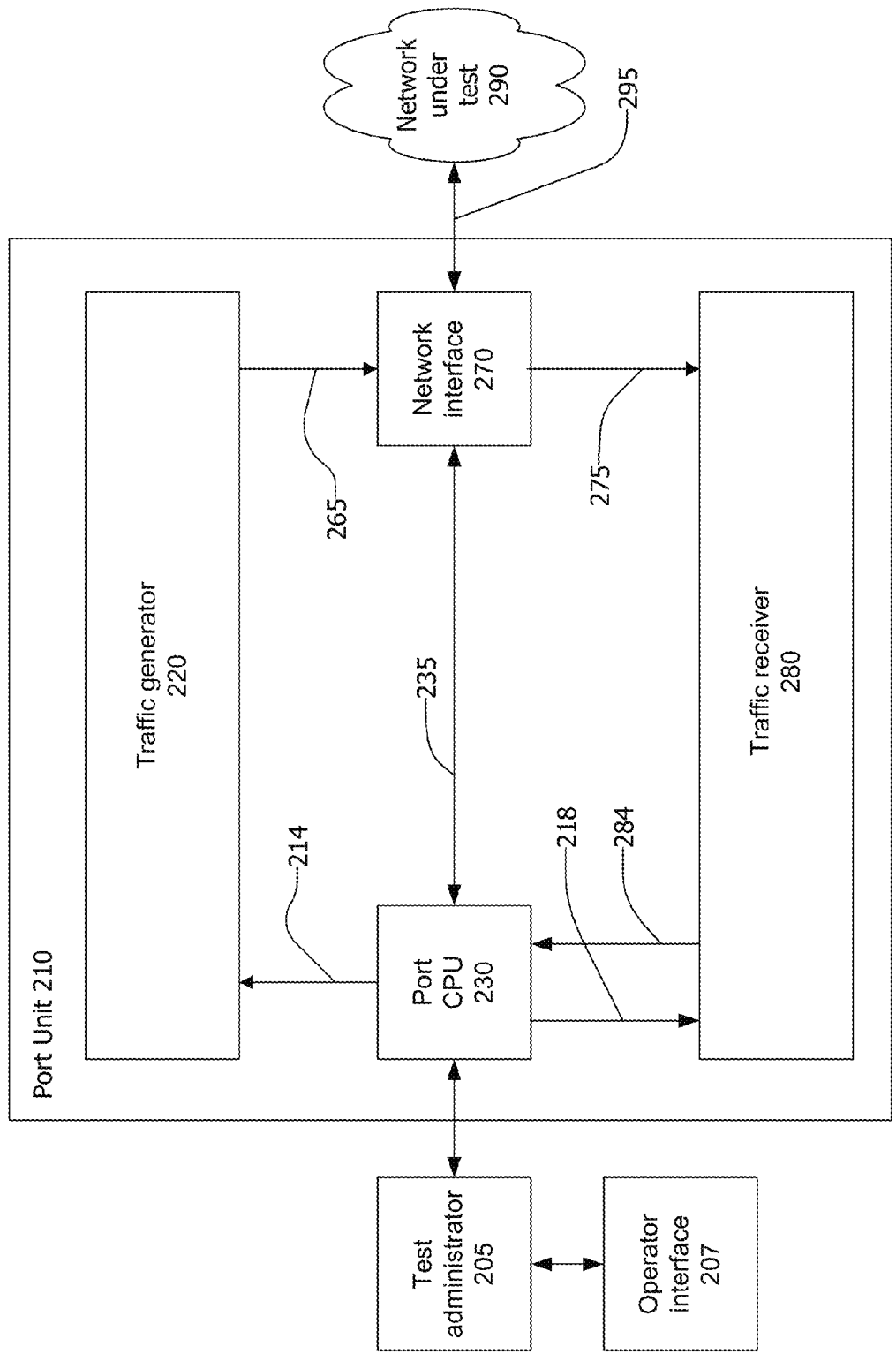
FIG. 2 is a block diagram of a port unit.

Referring now to FIG. 2, an exemplary port unit 210 may include a port central processor unit 212 (CPU), a traffic generator unit 220, a traffic receiver unit 280, and a network interface unit 270 which couples the port unit 210 to a network under test 290. The port unit 210 may be all or part of a network card such as the network cards 106.

The port CPU 212 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 212 may communicate with a test administrator 205, which in turn may communicate with or include an operator interface 207. The test administrator 205 may be a computing device contained within, or external to, the network test equipment 100. The test administrator 205 may provide the port CPU 212 with instructions and data required for the port unit to participate in testing the network 290. The instructions and data received from the test administrator 205 may include, for example, definitions of packet streams to be generated by the port unit 210 and definitions of performance statistics that may be accumulated and reported by the port unit 210.

The port CPU 212 may provide the traffic generator unit 220 with stream forming data 214 to form a plurality of streams. The stream forming data 214 may include, for example, the type of packet, the frequency of transmission, definitions of fixed and variable-content fields within the packet and other information for each packet stream. The traffic generator unit 220 may then generate the plurality of streams in accordance with the stream forming data 214. The plurality of streams may be interleaved to form outgoing traffic 265. Each of the streams may include a sequence of packets. The packets within each stream may be of the same general type but may vary in length and content.

The network interface unit 270 may convert the outgoing traffic 265 from the traffic generator unit 220 into the electrical, optical, or wireless signal format required to transmit the test traffic to the network under test 290 via a link 295. The link 295 may be a wire, an optical fiber, a wireless link, or other communication link. Similarly, the network interface unit 270 may receive electrical, optical, or wireless signals from the network over the link 295 and may convert the received signals into incoming traffic 275 in a format usable to the traffic receiver unit 280.

The traffic receiver unit 280 may receive the incoming traffic 275 from the network interface unit 270. The traffic receiver unit 280 may determine if each received packet is a member of a specific flow, and may accumulate test statistics for each flow in accordance with test instructions 218 provided by the port CPU 212. The accumulated test statistics may include, for example, a total number of received packets, a number of packets received out-of-sequence, a number of received packets with errors, a maximum, average, and minimum propagation delay, and other statistics for each flow. The traffic receiver unit 280 may also capture and store specific packets in accordance with capture criteria included in the test instructions 218. The traffic receiver unit 280 may provide test statistics and/or captured packets 284 to the port CPU 212, in accordance with the test instructions 218, for additional analysis during, or subsequent to, the test session.

Some amount of interactive communications may be required between the port unit 210 and the network 290 during a test session. The interactive communications may include, for example, TCP connections and application-layer transactions. Such traffic may be initiated, managed, and processed by the port CPU 230 and thus may be referred to as "CPU traffic". As shown in FIG. 2, the port CPU 230 may be coupled to the network interface unit 270 such that CPU traffic 235 may be communicated between the port CPU and the network 290 via the network interface unit 270. Although not shown in FIG. 2, outgoing CPU traffic may be routed from the Port CPU 230 to the network interface unit 270 via the traffic generator unit 220, and incoming CPU traffic may be routed from the network interface unit to the port CPU via the traffic receiver unit 280.

Figure 3:
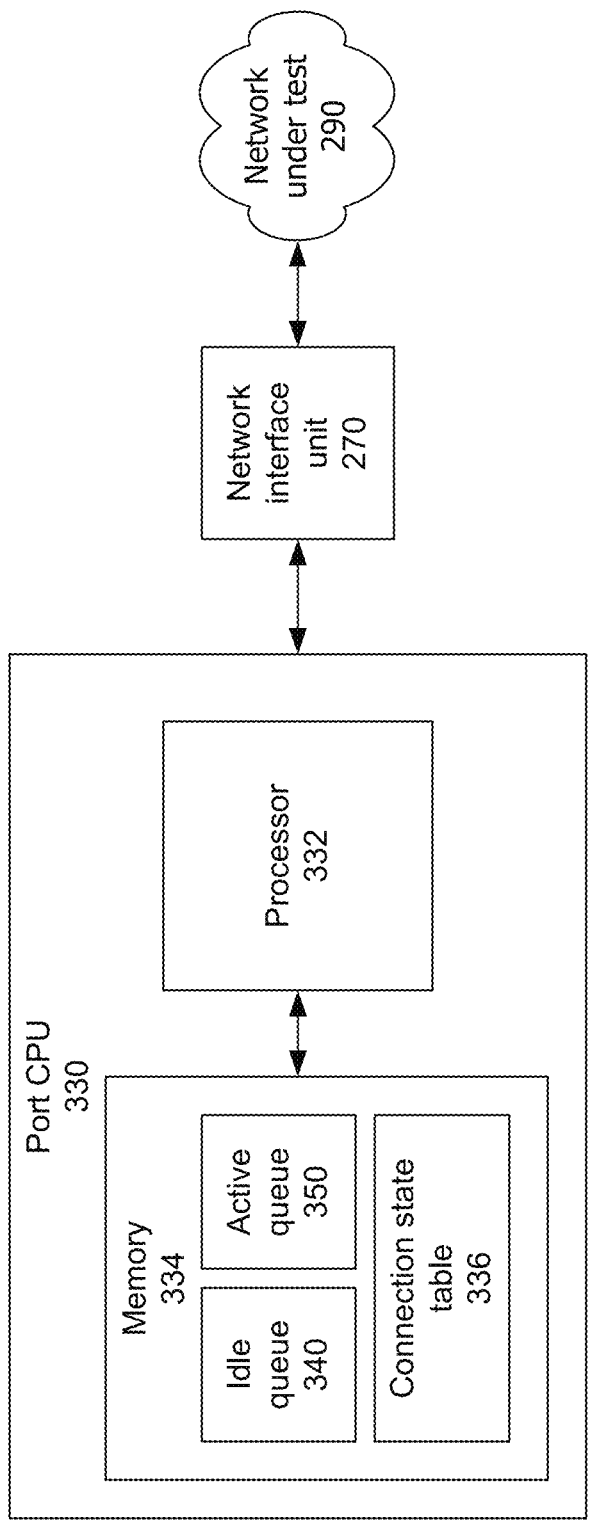
FIG. 3 is a block diagram of a port CPU and associated components.

Referring now to FIG. 3, a port CPU 330, which may be the port CPU 230, may include at least one processor 332 coupled to a memory 334. The processor 332 may be a single processor, multiple processors, or multiple processor cores within one or more processor circuit devices. The port CPU 330 may be configured to communicate with the network under test 290 via the network interface unit 270.

The memory 334 may be static and/or dynamic random access memory or a combination of random access memory and other memory such as nonvolatile writable memory and read only memory. The memory 334 may store programs in the form of instructions for execution by the processor 332 and data for use during the execution of those programs.

When the port CPU 330 initiates a TCP connection with the network under test, the port CPU 330 must maintain connection state information for each active connection. The connection state information may include, for each active TCP connection, source and destination IP addresses, source and destination port numbers, connection status (closed, open, being opened, being closed), and data defining what information has been sent via the TCP connection and what sent information has been acknowledged. When the port CPU 330 (or a plurality of port CPUs involved in a test session) initiates TCP connections at a rate that exceeds the capability of the network under test 290, the network under test may fail to respond to some or all new connection requests and/or existing connections. In this situation, the number of connections that the port CPU considers to be active may grow rapidly until the size of the memory required to store connection state information exceeds the size of the memory available within the port CPU. Overflowing the available memory may result in premature termination of a test session or the introduction of connection errors by the test system.

To preclude overflowing the port CPU memory, a portion of the memory 334 may be reserved to store a connection state table 336 for a predetermined finite number of predefined TCP connections. Each of the predefined TCP connections may be defined by a source IP address, a destination IP address, a source port number, and a destination port number. Each of the predefined TCP connections may be identified by a connection identifier derived from the source and destination IP addresses and the source and destination port numbers. The connection identifier may be derived, for example, as a hash of the source and destination IP addresses and the source and destination port numbers.

Another portion of the memory 334 may be used to store an idle queue 340 containing connection identifiers of those predefined TCP connections that are not presently active. A third portion of the memory 334 may be used to store an active queue 350 containing the connection identifiers of those predefined TCP connections that are presently active.

Figure 4:
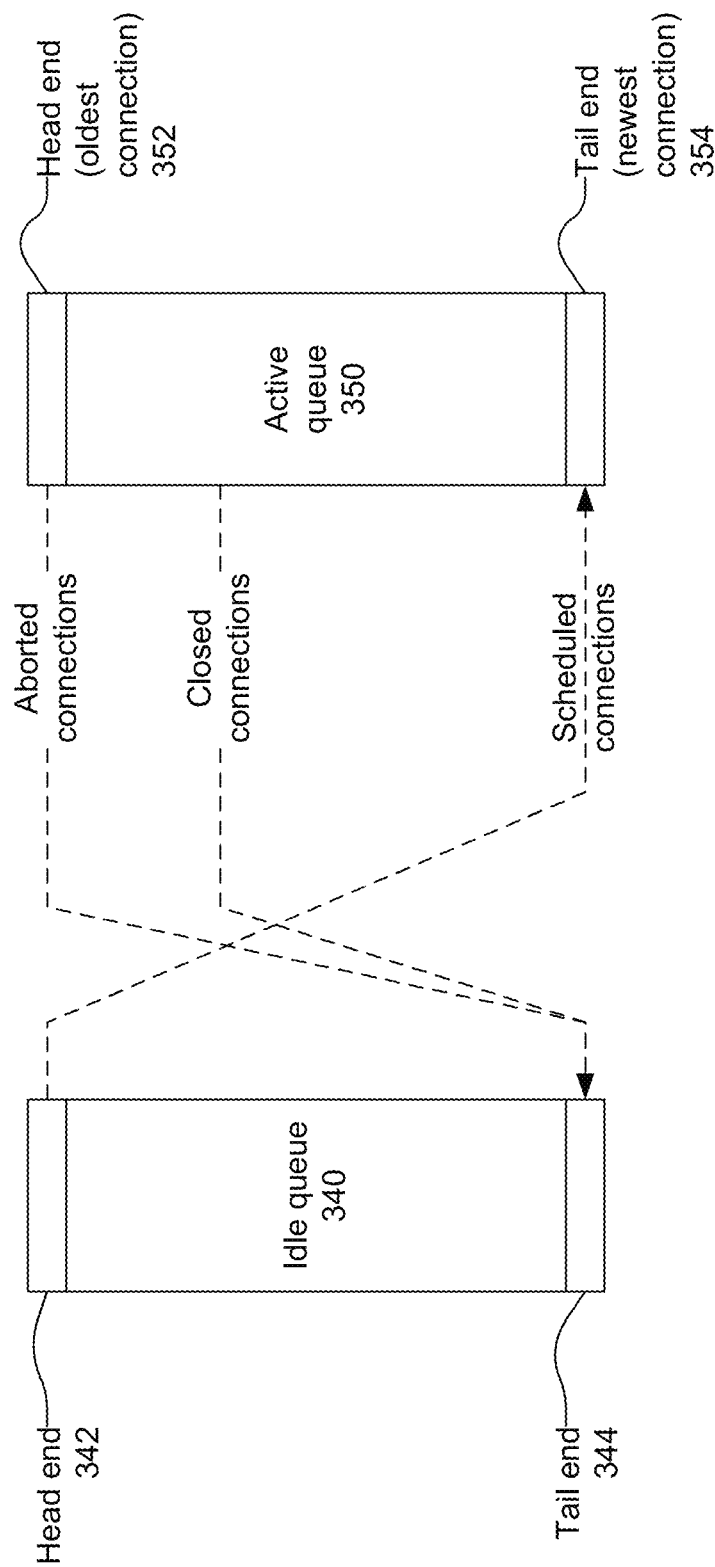
FIG. 4 is a graphical representation of queues within a port unit.

As shown in FIG. 4, the idle queue 340 may be organized as a first-in first-out (FIFO) queue having a head end 342 where connection identifiers are read out form the queue and a tail end 344 where connection identifiers are written into the queue. Connection identifiers of TCP connections that have been idle for the longest time (the connections de-activated first) may be located near the head end 342 of the idle queue and connection identifiers of most recently idled TCP connections may be located at the tail end 344 of the idle queue 340.

The active queue 350 may also be organized as a FIFO queue having a head end 352 where connection identifiers are read out from the queue and a tail end 354 where connection identifiers are written into the queue. Thus connection identifiers of older active TCP connections (the connections initiated first) may be located near the head end 352 of the active queue 350 and connection identifiers of most recently activated TCP connections may be located at the tail end 354 of the active queue 350.

During a test session, a TCP connection may be considered to be active from the time the TCP connection is scheduled to be opened until the time when the TCP connection is closed or aborted. Connection identifiers for new connections scheduled to be opened may be moved from the head end 342 of the idle queue 340 to the tail end 354 of the active queue 350. TCP connections that are closed normally may be moved from their respective positions in the active queue 350 to the tail end 344 of the idle queue 340. When the idle queue 340 does not contain sufficient connection identifiers to allow a desired number of new connections to be opened, one or more of the oldest active connections may be aborted (terminated unilaterally) and the corresponding connection identifiers may be moved from the head end 352 of the active queue to the tail end 344 of the idle queue 340. Moving the connection identifiers of closed or aborted connections to the idle queue 340 allows the same connections to be reused during the course of a test session. An arbitrarily large number of TCP connections can be opened during a test session by continuously reusing a finite number of defined connections.

Description of Processes

Figure 5:
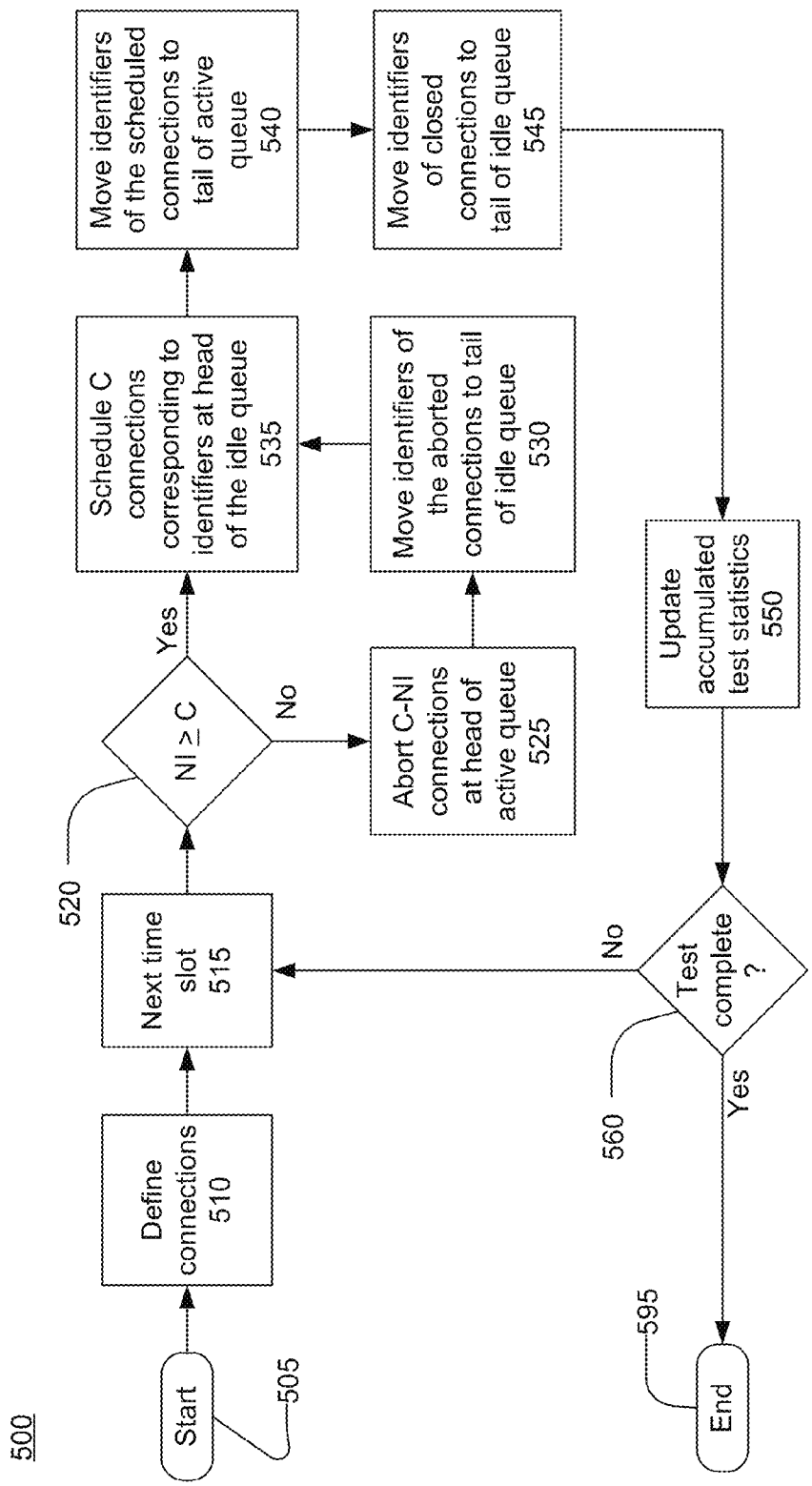
FIG. 5 is a flow chart of a process for testing TCP connection rate.

Referring now to FIG. 5, a process 500 for testing the TCP connection rate of a network or network device may start at 505 and may finish at 595 after a large number of TCP connections have been established. The process 500 may be executed within a test environment, such as that shown in FIG. 1, by one or more port units such as the port unit 210 shown in FIG. 2. The process 500 may be cyclic in nature, with the actions from 515 to 545 performed repeatedly. A test session may be divided into a sequence of equal-length consecutive time intervals or time slots. Each repetition of the actions from 515 to 545 may be performed within a respective time slot.

The following parameters, each of which is a positive integer, will be used to describe the process 500:
CAPS=connection attempts per second; the target rate at which new connections will be initiated;
N=number of time slots per second;
C=CAPS/N=number of connections initiated per time slot;
L=the minimum number of time slots that a connection must be active before it can be aborted;
NI=the number of session identifiers in the idle queue;
NA=the number of session identifiers in the active queue;
T=the total number of sessions=NI+NA.

At 510, T connections may be defined. Each connection may be defined, for example, by a source IP address, a destination IP address, a source port number, and a destination port number. Each of the T connections may be uniquely associated with a corresponding connection identifier. To ensure that every session is active for at least L time slots, the total number of sessions defined at 510 may be in accordance with the formula:

$$T \geq (L+1)C \qquad (1)$$

A larger number of connections may be defined as permitted by the available memory in the port CPU. Connection identifiers for connections defined at 510 may be placed in the idle queue. The process 500 may then wait at 515 until the start of the next time slot.

At the start of the next time slot, a determination may be made at 520 if NI≥C, which is to say if the idle queue holds enough connection identifiers to support opening C connections. When NI is greater than or equal to C, C connections corresponding to the C connection identifiers at the head of the idle queue may be scheduled to be opened at 535.

When a determination is made at 520 that NI is less than C, the C−NI oldest active connections at the head of the active queue may be aborted at 525. The connection identifiers of the aborted connections may be moved to the tail of the idle queue at 530. "Moving" the connection identifiers includes removing the connection identifiers from the head of the active queue and writing the connection identifiers at the tail of the idle queue. After the connection identifiers are moved, the idle queue will hold exactly C connection identifiers. C connections corresponding to the C connection identifiers in the idle queue may then be scheduled to be opened at 535.

At 540, the connection identifiers of the connections scheduled to be opened at 535 may be moved from the idle queue to the tail of the active queue. At 545, connection identifiers of connections, if any, that closed normally during the time slot may be added to the tail of the idle queue.

At 550, test statistics may be updated to reflect results for the current time slot. Test statistics that may be accumulated during a test session may include one or more of a total number of connections initiated, a total number of connections established, a total number of connections that closed normally, a total number of connections that were aborted, and average, minimum, and maximum pendency of the aborted connections.

At 560, a determination may be made if the test session has been completed. When the test session is completed, the process 500 may end at 595. When a determination is made at 560 that the test session is not completed, the process 500 may return to 515 to await the start of the next time slot.

FIG. 5 shows the process 500 as a series of sequential actions for ease of explanation. The actions within the process 500 may be performed in different order and many of the action may be performed in parallel rather than sequentially. For example, connection identifiers may be moved between the idle and active queues as each connection is scheduled or aborted rather than moving all of the identifiers as a group as shown in FIG. 5. Additionally, the predetermined number of connections may be defined in parallel with establishing initial connection at the start of a test session. For example, C connections may be defined and established each time slot at the start of a test until at total of T connections have been defined. After T connections have been defined, the process may proceed as shown from 515 to 595 in FIG. 5.

Figure 6:
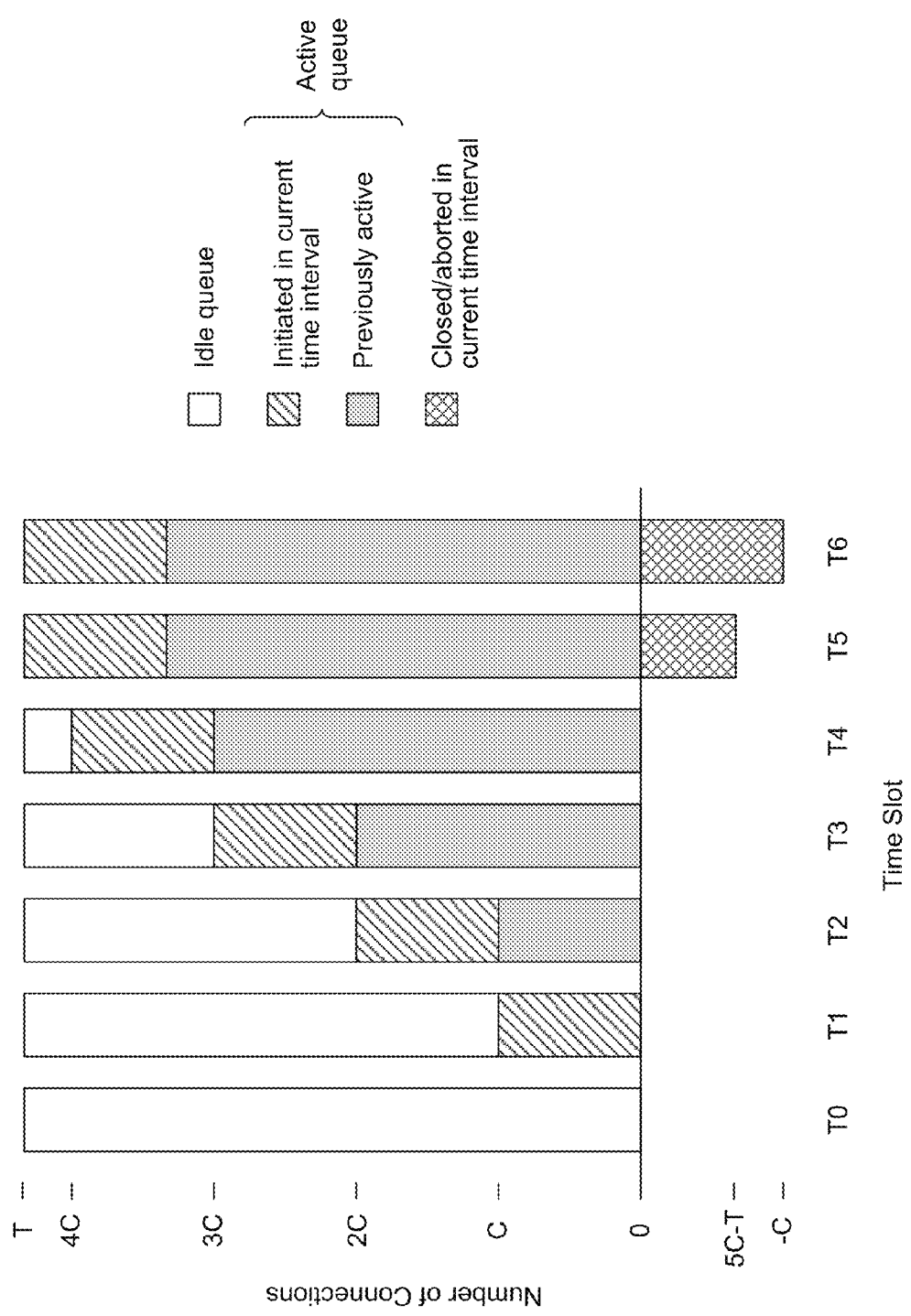
FIG. 6 is a chart showing exemplary results of the process of FIG. 5.

FIG. 6 is a graphic representation of exemplary results of the process 500 of FIG. 5. For this example, T (the total number of defined connections) is related to C (the number of connections to be opened each time slot) by the equation:

$$4C < T < 5C. \tag{2}$$

Additionally, in this example an assumption is made that no connections are ever closed normally.

In time slot T0, T connections are defined and connection identifiers for the T connections are placed in the idle queue. During time slot T1, C connections are initiated and the corresponding connection identifiers are moved to the active queue. At the end of time slot T1, T−C connection identifiers remain in the idle queue.

In time slot T2, C additional connections are activated. At the end of time slot T2, there are 2C connection identifiers in the active queue and T−2C connection identifiers remain in the idle queue. Similarly C additional connections are activated during time slots T3 and T4. At the end of time slot T4, there are 4C connection identifiers in the active queue and T−4C connection identifiers remain in the idle queue.

At the start of time slot T5, the number of connection identifiers in the idle queue is less than C. Thus, at the start of time slot T5, 5C−T connections at the head end of the active queue are aborted. C connections are then initiated. The C initiated connections include the T−4C connections present in the idle queue at the start of the time slot and the 5C−T connections that were just aborted. In T6 and subsequent time slots (still assuming that no connections are closed normally) C connections at the head end of the active queue may be aborted and immediately re-initiated. Throughout the process, C connections are initiated during each time slot and the total number of connections in the active and idle queues (and thus the total memory required to store connections state information) remains constant.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method to test connection rate of a network device, comprising:
    defining T connections between a test system and the network device, where T is a positive integer, each connection associated with a connection identifier;
    storing connection identifiers associated with active connection in a first-in first-out (FIFO) active queue;
    storing connection identifiers associated with inactive connections in a FIFO idle queue; and
    initiating C connections with the network device in each of a plurality of sequential time intervals, where C is a positive integer less than T, wherein initiating C connections further comprises:
        when a number NI of connection identifiers in the idle queue at the start of a time interval is less than C, aborting C−NI connections associated with connection identifiers at the head of the active queue and moving the connection identifiers associated with the C−NI aborted connection to the tail of the idle queue, and
        reading C connection identifiers from the head of the idle queue, scheduling the associated connections to be opened, and storing the C connection identifiers at the tail of the active queue.

2. The method of claim 1, wherein T and C are related by the equation T≥(L+1)C, wherein L is a minimum number of time intervals a connection must be active before being aborted.

3. The method of claim 1, further comprising in each of the plurality of sequential time intervals:
    moving connection identifiers associated with connections that closed normally from the active queue and to the tail of the idle queue.

4. The method of claim 1, further comprising:
    accumulating test statistics including one or more of a number of connections that closed normally, a number of connections that were aborted and average, minimum, and maximum pendency of the aborted connections.

5. A test system, comprising:
    a processor coupled to a network device under test;
    a memory coupled to the processor, a first portion of the memory holding a first-in first-out (FIFO) active queue to store connection identifiers associated with active connections between the test system and the network device, and a second portion of the memory holding a FIFO idle queue to store connection identifiers associated with inactive connections between the test system and the network device;
    the processor executing program instructions that cause the test system to perform actions including:
        defining T connections between the test system and the network device, where T is a positive integer, each connection associated with a connection identifier; and
        initiating C connections with the network device in each of a plurality of sequential time intervals, where C is a positive integer less than T, wherein initiating C connections further comprises:
            when a number NI of connection identifiers in the idle queue at the start of a time interval is less than C, aborting C−NI connections associated with connection identifiers at the head of the active queue and moving the connection identifiers associated with the C–NI aborted connection to the tail of the idle queue, and reading C connection identifiers from the head of the idle queue, scheduling the associated connections to be opened, and storing the C connection identifiers at the tail of the active queue.

6. The test system of claim 5, wherein T and C are related by the equation $T \geq (L+1)C$, wherein L is a minimum number of time intervals a connection must be active before being aborted.

7. The test system of claim 5, the actions performed further comprising in each of the plurality of sequential time intervals:

moving connection identifiers associated with connections that closed normally from the active queue and to the tail of the idle queue.

8. The test system of claim 5, the actions performed further comprising:

accumulating test statistics including one or more of a number of connections that closed normally, a number of connections that were aborted and average, minimum, and maximum pendency of the aborted connections.

* * * * *